June 8, 1926.

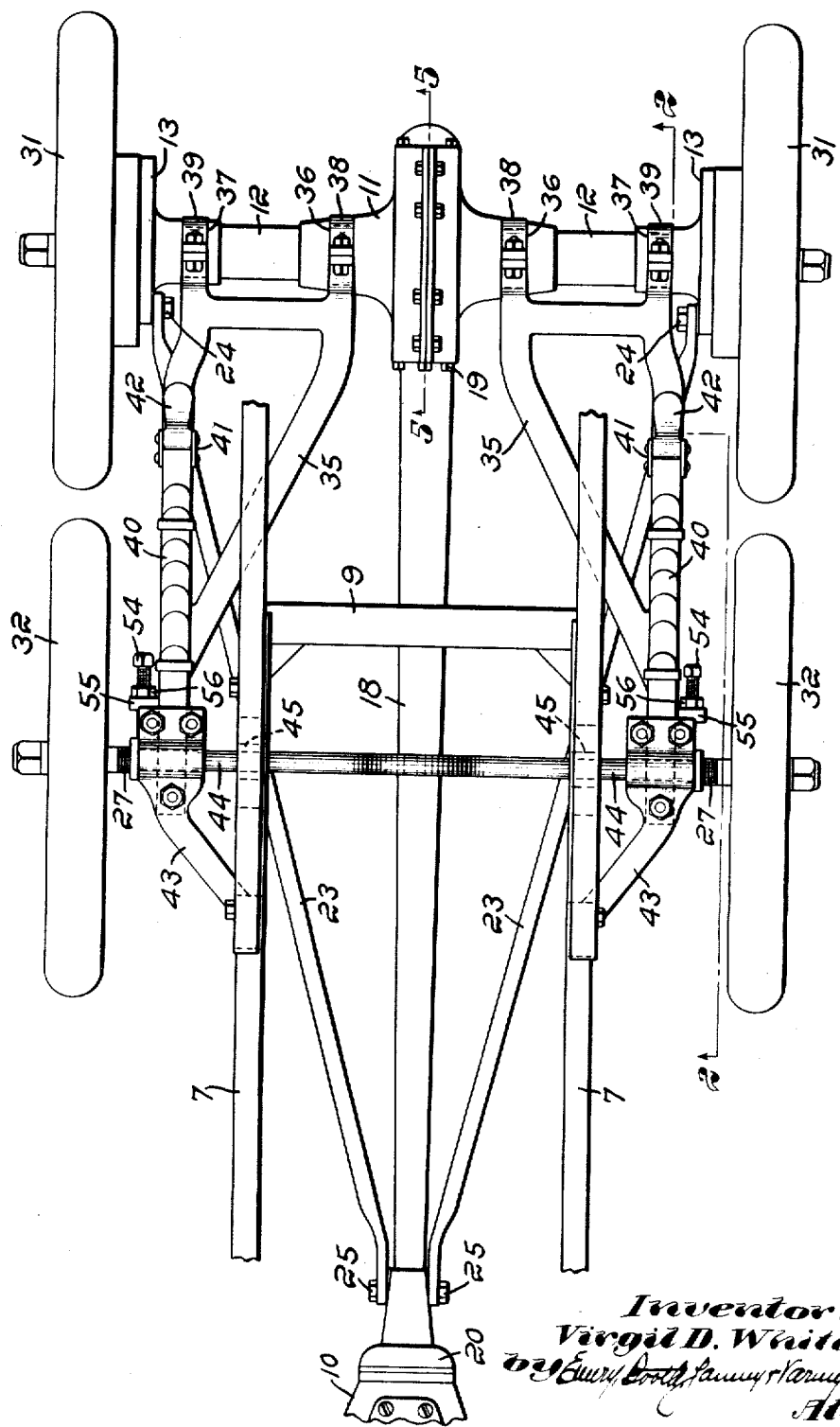

V. D. WHITE 1,587,570

VEHICLE PROPELLING MECHANISM

Filed May 20, 1924    2 Sheets-Sheet 2

Inventor:
Virgil D. White,
by Emery, Booth, Janney & Varney
Attys.

Patented June 8, 1926.

1,587,570

UNITED STATES PATENT OFFICE.

VIRGIL D. WHITE, OF WEST OSSIPEE, NEW HAMPSHIRE, ASSIGNOR TO SNOWMOBILE COMPANY, OF ROCHESTER, NEW HAMPSHIRE, A CORPORATION OF NEW HAMPSHIRE.

VEHICLE PROPELLING MECHANISM.

Application filed May 20, 1924. Serial No. 714,576.

This invention relates to a novel and improved vehicle propelling mechanism of the track-laying type, suitable for use in connection with ordinary motor cars to adapt them for use on snow and other surfaces, where sufficient traction and contact are not afforded by wheels, and where the wheels otherwise would sink down into the snow, and render the motor car useless.

The invention will be best understood by reference to the following description, when taken in connection with the accompanying drawings of one specific embodiment thereof, while its scope will be more particularly pointed out in the appended claims.

In the drawings:

Fig. 5 is a sectional view on line 5—5 of Fig. 1.

Figure 2:
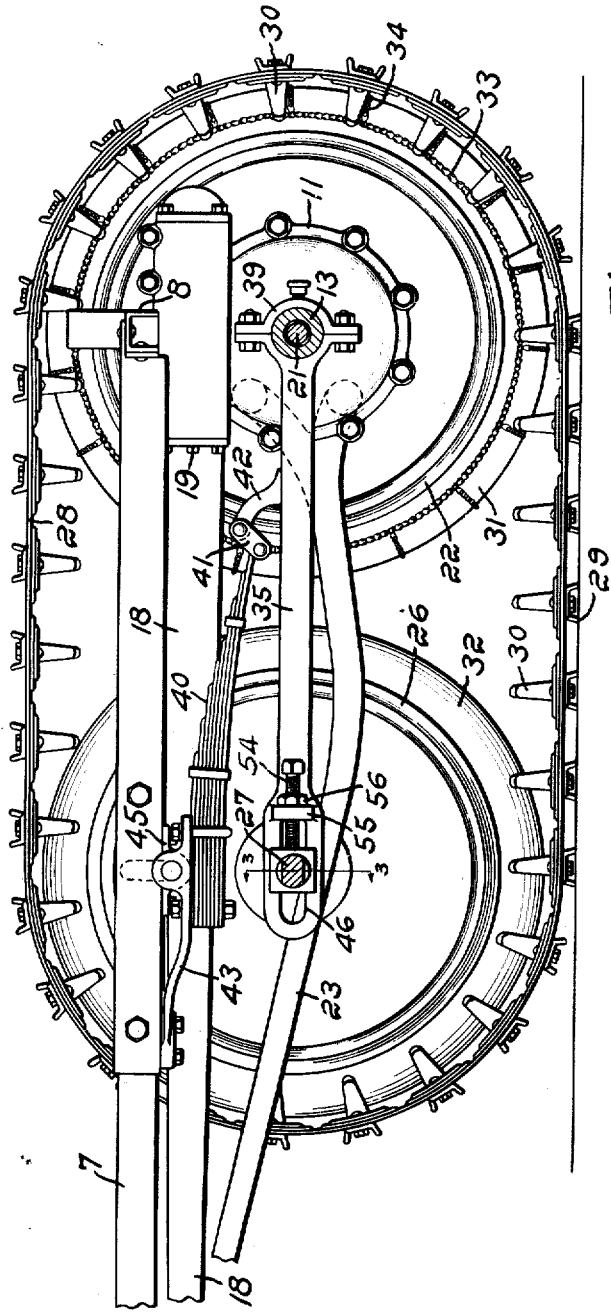
Fig. 2 is a sectional view on line 2—2 of Fig. 1.
Figure 1:
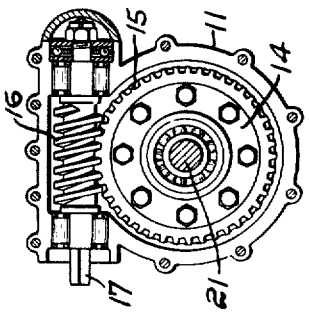
Fig. 1 is a plan of a portion of a motor vehicle having a propelling mechanism embodying the invention, the endless tracks being omitted in this view, the better to illustrate the remainder of the mechanism.

Referring to the drawings, and to the embodiment of the invention which is selected for exemplification, there is shown a portion of a motor vehicle having a main frame comprising longitudinal bars 7 (see Figs. 1 and 2) and transverse bars 8 and 9. This frame supports a power plant including a clutch and transmission having a housing, a portion of which is shown at 10 in Fig. 1.

The vehicle is provided with a rear axle of suitable construction, the one herein shown comprising a differential housing 11, two tubes 12 inserted therein and extending laterally therefrom, and two brake mountings 13, into which the other ends of the tubes extend. The differential housing encloses a usual differential gearing including a carrier 14 (see Fig. 5), to which is secured a gear such as a worm gear 15, which meshes with and is driven by a worm 16. The worm is driven by a usual longitudinal driving shaft, a portion of which is shown at 17, housed in a torque tube 18, the rear end of which is secured by bolts 19 to the housing 11. The front end of the torque tube is connected to the clutch and transmission housing 10 (see Fig. 1) by a usual universal joint 20, which permits the rear axle and torque tube to play up and down and to turn about a longitudinal axis. The differential gearing transmits power in a well-known manner to two axle shafts 21, one of which is shown in section in Fig. 5, and by these shafts rear wheels 22 are driven, as by being keyed to the shafts in a well-known manner. Brace rods 23, sometimes called radius rods, are secured at their rear ends by bolts 24 (see Fig. 1) to the brake mountings 13, while the front ends of said rods are secured to the other end of the torque tube by bolts 25. The vehicle as thus far described may be of any usual or suitable construction.

Forward of the rear wheels are auxiliary or idler wheels 26, which turn on and about the spindles 27, which are independently mounted in a manner presently to be described. Associated with each rear driving wheel and its companion auxiliary wheel is an endless traction belt or track 28, having appropriate cleats 29, which afford good traction. To maintain the proper lateral relationship between the belt and the wheels, the belt herein is provided with a series of inwardly disposed projections, herein brackets 30, which embrace the usual tires, such as pneumatic tires 31 and 32 on the rear and auxiliary wheels. A practically non-slipping driving connection between the rear tires and the traction belts is conveniently afforded by traction chain 33, about the tires, and having cross chains 34 interspersed between the brackets 30. The auxiliary wheels are mounted for independent movement and adjustment, and the load is distributed between the rear and auxiliary wheels in a manner which will now be described, reference being had at first to Fig. 1.

Each wheel spindle is mounted on a carrier 35, appropriately supported on the rear axle, as by a pivotal joint co-axial with the latter, this being conveniently accomplished in the present example by providing the differential housing 11 and the brake support 13 with annular grooves 36 and 37, respectively, to receive split bearings 38 and 39, presented by the carrier. This construction permits each auxiliary wheel to move vertically independently of the other, while its axis is maintained in parallelism with the axis of the rear axle. This has several advantages, among them being the fact that, in travelling over uneven surfaces, independent movement of the wheels is permitted, thereby preventing twisting of the traction belts, distortion of any of the mechanism, and ensuring maximum traction of both belts at all times, regardless of inequalities of the surface of the snow at the two sides of the machine. This is especially important when passing in and out of ruts, and in travelling over drifted snow, which otherwise would interfere with the traction.

Proper distribution of the weight between the rear and auxiliary wheels is obtained by supporting the load carrying frame intermediate the axes of the rear and auxiliary wheels, herein at a point somewhat nearer to the axis of the rear wheels than to that of the auxiliary wheels. Roughly speaking, the point of support is about one-third of the distance from the axis of the rear wheels to that of the auxiliary wheels, so that in a general way, about two-thirds of the load is carried on the rear wheels and one-third on the auxiliary wheels. This is conveniently accomplished in the present example by the use of two quarter-elliptic springs 40, whose rear ends are connected by shackles 41 to brackets 42 on the carriers 35, while the front ends of these springs are rigidly secured to the frame, as by brackets 43 secured to the frame 7. In the present example, owing to the fact that the springs are considerably offset from the sides of the frame (see Fig. 1), the means of attachment of the springs with the frame is strengthened by a transverse rod 44, which is mounted in brackets 45 on the frame, and has its terminal portions received in the brackets 43. To avoid interference of this rod with the torque tube 18, the central portion of the rod is bent or bowed in an upward direction.

Figure 4:
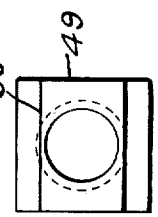
Fig. 4 is a detail end view of one of the sliding blocks shown in Fig. 3.
Figure 3:
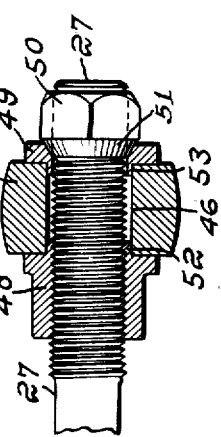
Fig. 3 is a sectional view on an enlarged scale on line 3—3 of Fig. 2.

Independent adjustment of the tensions of the traction belts is conveniently accomplished by providing each of the carriers 35 with a longitudinal slot 46 (see Fig. 2), which receives two sliding blocks 48 and 49 (see Fig. 3), one, herein the block 48, having screw-threaded engagement with the spindle, and the other presenting an abutment for a nut 50 threaded onto the spindle. The width of the slot is somewhat greater than the diameter of the spindle, and interference of the threads with the slot is thereby avoided. A conical projection 51 on the nut is received in a corresponding opening in the block 49, and serves to center the spindle and take the load. Rotation of the blocks is prevented by providing them with reduced portions 52 and 53, which have a snug working fit in the slot 46. The appearance presented by the inner face of each block is exemplified in Fig. 4, which shows the inner face of the block 49.

It should now be evident that, by simply loosening the nut 50, the spindle can be placed in the proper position, after which it is clamped by tightening the nut. As an additional precaution, to prevent accidental sliding movement of the block in a rearward direction owing to the belt tension, in the present example, I have provided a set-screw 54 (see Fig. 2), extending through and having screw-threaded engagement with a lug 55 presented by the carrier 35, a locknut 56 being provided to lock the set-screw in the desired position of adjustment.

It is important that each auxiliary wheel should accurately track with its companion rear wheel, thereby to ensure true running of the traction belts, and to prevent chafing of the tires by the yoke-like brackets 30, which embrace them. In practice, it is found that wheels differ somewhat in dimensions, and more particularly that some are dished more than others. These variations can be compensated for very conveniently by adjusting the auxiliary wheels along their axes. This is effected by simply loosening the nut 50 to the necessary extent, and turning the spindle in the block 48 in which it is threaded. When the proper alignment of the wheels has been obtained, the nut is tightened, and the wheel is securely held in its proper position.

Having thus described one embodiment of the invention, but without limiting myself thereto, what I claim and desire by Letters Patent to secure is:

1. In a motor vehicle, the combination of a rear axle, a pair of driving wheels carried by said axle, a second pair of wheels forward of said driving wheels, driving connections between said driving wheels and said second wheels, respectively, separate mountings for said second wheels, pivoted on said rear axle to turn about horizontal axes, and a load-supporting frame supported by said mountings and thus jointly supported by said driving wheels and by said second wheels.

2. In a motor vehicle, the combination of a rear axle, a pair of load-sustaining driving wheels carried by said axle, a pair of front auxiliary load-sustaining wheels, a pair of traction belts for driving said auxiliary wheels from said driving wheels and for sustaining the load of said wheels, a load-supporting frame, and means to support said frame on said wheels and to predetermine the distribution of its weight thereon with the greater proportion of the weight on said driving wheels.

3. In a motor vehicle, the combination of a rear axle, a pair of load-sustaining driving wheels carried by said axle, a pair of front auxiliary load-sustaining wheels, a pair of traction belts for driving said auxiliary wheels from said driving wheels and for sustaining the load of said wheels, a load-supporting frame, and means supporting said frame on and intermediate said driving wheels and said idler wheels.

4. In a motor vehicle, the combination of a rear axle, a pair of load-sustaining driving wheels carried by said axle, a pair of front auxiliary load-sustaining wheels, a pair of traction belts for driving said idler wheels from said driving wheels and for sustaining the load of said wheels, a load-supporting frame, and means pivotally supporting said frame on and intermediate said driving wheels and said auxiliary wheels.

5. In a motor vehicle, the combination of a rear axle, a pair of driving wheels carried by said axle, a pair of idler wheels, a pair of traction belts for driving said idler wheels from said driving wheels, and means for adjusting said idler wheels axially to track with said driving wheels.

6. In a motor vehicle, the combination of a rear axle, a pair of driving wheels carried by said axle, a pair of idler wheels, a pair of traction belts for driving said idler wheels from said driving wheels, spindles for said idler wheels, supports for said spindles, and means providing for axial adjustment of said spindles relatively to their respective supports.

7. In a motor vehicle, the combination of a rear axle, a pair of driving wheels carried by said axle, a pair of idler wheels, a pair of traction belts for driving said idler wheels from said driving wheels, spindles for said idler wheels, supports for said spindles on said axle, and means providing for axial adjustment of said spindles relatively to their respective supports.

8. In a motor vehicle, the combination of a rear axle, a pair of driving wheels carried by said axle, a pair of idler wheels, a pair of traction belts for driving said idler wheels from said driving wheels, spindles for said idler wheels, and supporting means into which said spindles are threaded for axial adjustment.

9. In a motor vehicle, the combination of a rear axle, a pair of driving wheels carried by said axle, a pair of idler wheels, a pair of traction belts for driving said idler wheels from said driving wheels, threaded spindles for said idler wheels, nuts into which said spindles are threaded and by which said spindles are supported, and means for suporting a load on said nuts.

10. In a motor vehicle, the combination of a rear axle, a pair of driving wheels carried by said axle, a pair of idler wheels, a pair of traction belts for driving said idler wheels from said driving wheels, threaded spindles for said idler wheels, nuts into which said spindles are threaded and by which said spindles are supported, and means carried by said rear axle for supporting said nuts.

11. In a motor vehicle, the combination of a rear axle, a pair of driving wheels carried by said axle, a pair of idler wheels, a pair of traction belts for driving said idler wheels from said driving wheels, threaded spindles for said idler wheels, nuts into which said spindles are threaded and by which said spindles are supported, and supports carried by said rear axle and in turn carrying said nuts, said supports presenting slots which receive said spindles.

12. In a motor vehicle, the combination of a rear axle, a pair of driving wheels carried by said axle, supports carried by said axle, spindles carried by said supports and having means for axial adjustment relatively thereto, idler wheels carried by said spindles, respectively, and a pair of traction belts connecting said driving wheels to said idler wheels.

13. In a motor vehicle, the combination of a rear axle, a pair of driving wheels carried by said axle, supports carried by said axle, spindles carried by said supports and having means for axial adjustment relatively thereto, wheels carried by said spindles, respectively, and driving connections between said driving wheels and the wheels carried by said spindles.

14. In a motor vehicle, the combination of a rear axle, a pair of driving wheels carried by said axle, a second pair of wheels, a pair of traction belts connecting said driving wheels with said second wheels, respectively, spindles for said second wheels, respectively, and means providing for axial adjustment of said spindles to cause said second wheels to track with said driving wheels, respectively.

15. In a vehicle, the combination of a rear axle, a pair of driving wheels carried thereby, a second pair of wheels, flexible driving connections between said driving wheels and said second wheels, and means for adjusting said second wheels independently of each other to vary the tension of said driving connections independently while maintaining parallelism of the axes of said second wheels with respect to the axes of said driving wheels.

16. In a vehicle, the combination of a rear axle, a pair of driving wheels carried thereby, a second pair of wheels, a pair of spindles for said second pair of wheels, flexible driving connections between said driving wheels and said second wheels, mountings for said spindles, respectively, and means providing for adjustment of said spindles independently of each other with relation to their respective mountings to vary the tension of said driving connections independently.

17. In a motor vehicle, the combination of an axle, a pair of load-sustaining driving wheels carried by said axle, a pair of auxiliary load-sustaining wheels, driving connections between said driving wheels and said auxiliary wheels, load-supporting means supported by and connecting said driving wheels and said auxiliary wheels, and a load-supporting frame supported by said load-supporting means.

18. In a motor vehicle, the combination of an axle, a pair of load-sustaining driving wheels carried by said axle, a pair of auxiliary load-sustaining wheels, driving connections between said driving wheels and said auxiliary wheels, load-supporting means supported by and connecting said driving wheels and said auxiliary wheels and maintaining them in definitely spaced relationship, a load-supporting frame, and cushioning means interposed between said load-supporting frame and said load-supporting means and supporting the former on the latter.

19. In a motor vehicle, the combination of an axle, a pair of driving wheels carried by said axle, a pair of auxiliary wheels, driving connections between said driving wheels and said auxiliary wheels, load-supporting means directly connecting said driving wheels and said auxiliary wheels, and a load-supporting frame supported directly by said load-supporting means intermediate said driving wheels and said auxiliary wheels.

20. In a motor vehicle, the combination of an axle, a pair of driving wheels carried by said axle, a pair of auxiliary wheels, driving connections between said driving wheels and said auxiliary wheels, load-supporting means deriving support solely from said driving wheels and said auxiliary wheels, and a load-supporting frame deriving support from said wheels solely through said load-supporting means.

21. In a motor vehicle, the combination of an axle, a pair of load-sustaining driving wheels carried by said axle, a pair of auxiliary load-sustaining wheels, a pair of auxiliary wheel carriers flexibly connected with said axle, driving connections between said driving wheels and said auxiliary wheels, and a load-supporting frame supported by said wheel carriers and deriving support from said wheels solely through said wheel carriers.

In testimony whereof, I have signed my name to this specification.

VIRGIL D. WHITE.

an axle, a pair of load-sustaining driving wheels carried by said axle, a pair of auxiliary load-sustaining wheels, driving connections between said driving wheels and said auxiliary wheels, load-supporting means supported by and connecting said driving wheels and said auxiliary wheels, and a load-supporting frame supported by said load-supporting means.

18. In a motor vehicle, the combination of an axle, a pair of load-sustaining driving wheels carried by said axle, a pair of auxiliary load-sustaining wheels, driving connections between said driving wheels and said auxiliary wheels, load-supporting means supported by and connecting said driving wheels and said auxiliary wheels and maintaining them in definitely spaced relationship, a load-supporting frame, and cushioning means interposed between said load-supporting frame and said load-supporting means and supporting the former on the latter.

19. In a motor vehicle, the combination of an axle, a pair of driving wheels carried by said axle, a pair of auxiliary wheels, driving connections between said driving wheels and said auxiliary wheels, load-supporting means directly connecting said driving wheels and said auxiliary wheels, and a load-supporting frame supported directly by said load-supporting means intermediate said driving wheels and said auxiliary wheels.

20. In a motor vehicle, the combination of an axle, a pair of driving wheels carried by said axle, a pair of auxiliary wheels, driving connections between said driving wheels and said auxiliary wheels, load-supporting means deriving support solely from said driving wheels and said auxiliary wheels, and a load-supporting frame deriving support from said wheels solely through said load-supporting means.

21. In a motor vehicle, the combination of an axle, a pair of load-sustaining driving wheels carried by said axle, a pair of auxiliary load-sustaining wheels, a pair of auxiliary wheel carriers flexibly connected with said axle, driving connections between said driving wheels and said auxiliary wheels, and a load-supporting frame supported by said wheel carriers and deriving support from said wheels solely through said wheel carriers.

In testimony whereof, I have signed my name to this specification.

VIRGIL D. WHITE.

Certificate of Correction.

It is hereby certified that in Letters Patent No. 1,587,570, granted June 8, 1926, upon the application of Virgil D. White, of West Ossipee, New Hampshire, for an improvement in "Vehicle Propelling Mechanism," errors appear in the printed specification requiring correction as follows: Page 1, line 6, after the word "contact" insert the word *area;* page 3, lines 6 and 11, claims 3 and 4, for the word "idler" read *auxiliary;* and that the said Letters Patent should be read with these corrections therein that the same may conform to the record of the case in the Patent Office.

Signed and sealed this 20th day of July, A. D. 1926.

[SEAL.]
M. J. MOORE,
*Acting Commissioner of Patents.*

Certificate of Correction.

It is hereby certified that in Letters Patent No. 1,587,570, granted June 8, 1926, upon the application of Virgil D. White, of West Ossipee, New Hampshire, for an improvement in "Vehicle Propelling Mechanism," errors appear in the printed specification requiring correction as follows: Page 1, line 6, after the word "contact" insert the word *area;* page 3, lines 6 and 11, claims 3 and 4, for the word "idler" read *auxiliary;* and that the said Letters Patent should be read with these corrections therein that the same may conform to the record of the case in the Patent Office.

Signed and sealed this 20th day of July, A. D. 1926.

[SEAL.]

M. J. MOORE,
*Acting Commissioner of Patents.*